United States Patent [19]
Gof

[11] 3,954,079
[45] May 4, 1976

[54] DUAL HULL WATER BICYCLE
[76] Inventor: Mohammed S. Gof, 89 Haldon Ave., Paterson, N.J. 07522
[22] Filed: Mar. 10, 1975
[21] Appl. No.: 557,158

Related U.S. Application Data
[60] Continuation-in-part of Ser. No. 420,101, Nov. 29, 1973, abandoned, which is a division of Ser. No. 148,526, June 1, 1971, Pat. No. 3,791,332.

[52] U.S. Cl. .................................. 115/2; 114/61; 115/26
[51] Int. Cl.² ...................................... B60F 3/00
[58] Field of Search .................. 115/1 A, 2, 21, 22, 115/23, 24, 25, 26, 27; 114/61, 144 A, 153

[56] References Cited
UNITED STATES PATENTS

| | | | |
|---|---|---|---|
| 557,647 | 4/1896 | Boulter | 115/26 |
| 1,244,073 | 10/1917 | Pavese | 115/24 |
| 1,550,344 | 8/1925 | Copes | 115/1 R |
| 1,646,664 | 10/1927 | Sanni | 115/1 R |

FOREIGN PATENTS OR APPLICATIONS

| | | | |
|---|---|---|---|
| 1,190,501 | 10/1959 | France | 114/61 |
| 408,994 | 4/1910 | France | 115/2 |

Primary Examiner—Trygve M. Blix
Assistant Examiner—Charles E. Frankfort
Attorney, Agent, or Firm—James J. Cannon, Jr.; James J. Cannon

[57] ABSTRACT

A dual hull water bicycle for use over land and water comprising in combination a pair of passenger-carrying side boats operably connected to a centrally disposed bicycle type frame member which provides independent, disengagable dual propulsion through a laterally extending drive shaft disengable from wheel axle shafts for land propulsion and disengageable from a lever gear operably connecting said drive shaft to a propeller drive shaft for propulsion over water.

1 Claim, 7 Drawing Figures

DUAL HULL WATER BICYCLE

CROSS REFERENCE

This application is a continuation in part of my prior application, Ser. No. 420,101, filed Nov. 29, 1973 now abandoned, which was a division of my prior application Ser. No. 148,526 filed June 1, 1971, and now U.S. Pat. No. 3,791,332.

BACKGROUND OF THE INVENTION

1. Field of the Invention

This invention pertains to an amphibious passenger-carrying vehicle propelled by a bicycle-type apparatus, having wheels and a propeller which are driven independently by the bicyle-type apparatus and dual hulls serving for flotation over water and for means of carrying passengers over land or water.

2. Description of the Prior Art

The prior art discloses many varieties of water bicycles, each of which is designed to serve differing or similar functions. Examples may be found in U.S. Pat. Nos. 3,791,332; 3,640,239; 3,397,669; 1,646,664; 75,531; and many others.

The apparatus disclosed herein differs from the prior art in two significant factors. First, to the best of the inventor's knowledge, it is the only multiple hull water bicycle in wich passengers may be carried in all the hulls. Second, it is much less complex than prior art devices.

The present disclosure includes an amphibious type water bicycle capable of carrying a plurality of passengers and is adequately balanced by its double hull structure to prevent toppling. The dual hulls serve two functions, flotation and carrying people. The present disclosure also enables the land or sea propulsion means to be disengaged when not in use.

SUMMARY OF THE INVENTION

The present invention provides a novel and improved construction for an amphibious water bicycle which is capable of carrying a number of persons by utilization of a pair of hulls or side boats operably connected to a centrally located bicycle seat and frame, and is readily driven on land or water. Toward this end, the preferred embodiment provides a water bicycle comprising a pair of laterally spaced side boats or hulls interconnected by means of a common drive shaft that is operably connected with the drive chain of a bicycle frame centrally disposed between the hulls. The drive shaft is operably connected to and disengagable from two laterally disposed axles each of which supports one pair of opposed wheels, and is also operably constructed to and disengagable from a propeller shaft on which a propeller is mounted. The bicycle frame also includes a conventional steering shaft having connected thereto at the bottom of a wheel and at the top handle bars to enable the operator to steer the water bicycle.

The present invention provides a novel construction and combination of parts as will hereinafter be described in detail, which overcomes the deficiencies of the prior art.

DESCRIPTION OF THE PREFERRED EMBODIMENT

Figure 1:
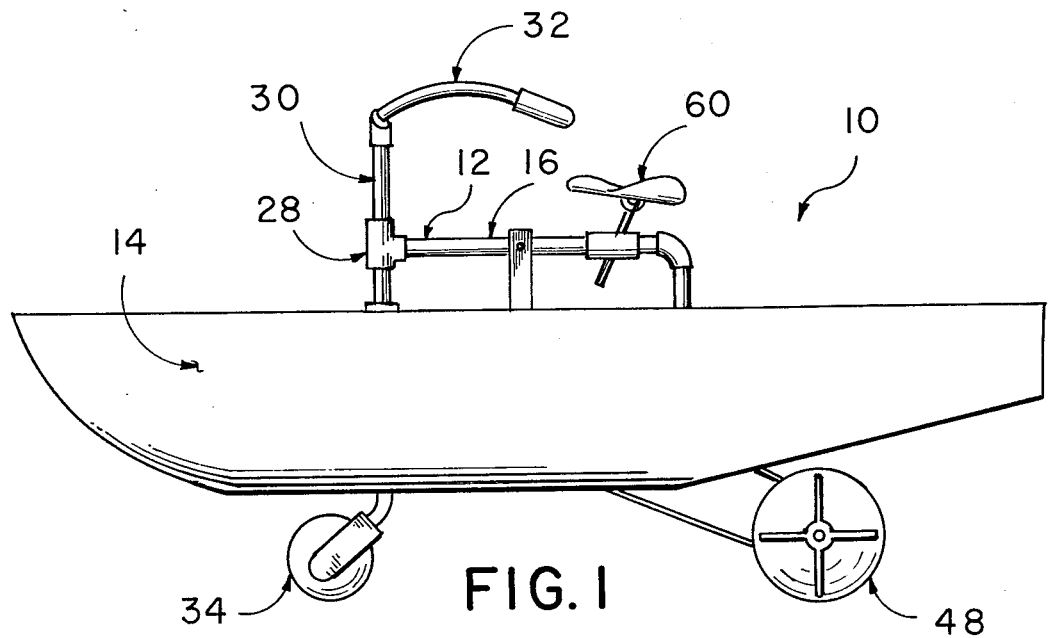
FIG. 1 is a side elevational view of a water bicycle in accordance with the present invention.
Figure 3:
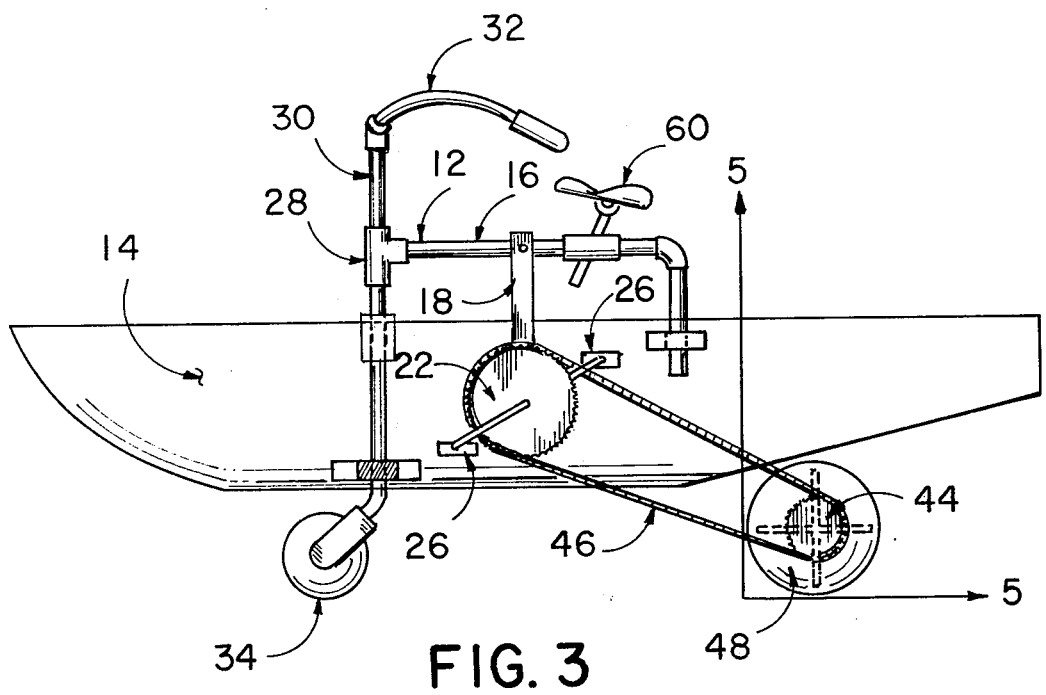
FIG. 3 is a cross-sectional view taken along lines 3—3 of FIG. 2.

Having reference now to the drawings, wherein like parts are designated by like reference numerals, there is shown in FIG. 1 a vehicle 10 comprising a bicycle frame generally designated 12 centrally disposed between a pair of side boats or hulls 14. The bicycle frame 12 includes a horizontal support rail 16 to which is secured a pair of laterally spaced parallel downward extending pedal support bars 18. A pedal shaft 20 is journaled at the bottom end of said bars 18 and is fixed to a pedal sprocket 22 for movement therewith. Each pedal shaft 20 extends laterally outwards and through an opening in the interior side wall 24 of each hull when it receives a pedal 26 adapted to be operated in the usual manner. The forward portion of the horizontal rail is provided with a bored collar 28 which receives for universal movement of a vertical steering shaft 30. A pair of steering handles 32 are connected in a conventional manner to the upper end of the shaft 30 and at its lower end the shaft 30 carries a steering wheel 34 that will cause the vehicle 10 to move in accordance with the movement of the handle bars 32 by the operator. The horizontal rail 16 is connected at its forward end and rearward end by U-shaped cross-bars 36 which, in turn, are secured to the side boats or hulls 14 by bolts or any other means suitable and compatible with the material of which hulls 14 are fabricated. The vertical legs of cross-bars 36 may be constructed to permit vertical adjustment of horizontal rail 16.

At the rear on the bottom of hulls 14 there is provided a laterally extending horizontal drive 38 journaled for free rotation in a pair of elongated hollow members 40 which are secured to the underside of each hull 14. These members 40 contain suitable bushings or bearings to permit free rotation of the drive shaft 38. To engage each axle member 41 to drive shaft 38, a locking pin 42 must be inserted into overlapping portions 43 of drive shaft 38 and axle members 40. A sprocket 44 is centrally fixed on drive shaft 38 and is connected to the pedal drive 22 by an endless chain 46 such that as the operator turns the pedals the drive shaft 38 will rotate in the direction of the pedal movement. At each exterior end of axle 40 there is provided a large wheel 48. Alternatively, wheels 48 could be located adjacent the inner sides of the hulls 14 instead of being disposed on the outer side as shown. Conventional means may be provided for tightening the chain 46.

As described heretofore, vehicle 10 is adapted for movement over land. When it is desired to operate vehicle 10 on water and there is no need to drive wheels 48, axle members 40 may be disengaged from drive shaft 38 by removing locking pins 42.

To provide for movement in water, there is further provided a large bevel gear 50 mounted on drive shaft 38, and a downward slanting horizontally oriented propeller shaft 52 which has its forward end a small bevel gear 54 which can be operably engaged by a large bevel gear 50. Propeller shaft 52 is suitably secured to each hull 14 by brackets 56 extending laterally to each of said hulls 14. Brackets 56 must be capable of permitting a slight forward and rearward movement of propeller shaft 52 such that when shaft 52 is moved forward its bevel gear 50 is engaged and when the shaft 52 is moved slightly rearward said bevel gears 50, 52 are disengaged. Clamps 58 are provided to lock propeller shaft 52 in either position. The reward end of propeller shaft 52 is provided with propeller 60 as a driving means in water. When bevel gears 50, 54 are engaged, propeller shaft 52 will rotate propeller 60 when the pedals 26 of vehicle 10 are operated.

A vertical adjustment seat 60 is provided between the extremities of horizontal rail 16, being slightly disposed to the rear of pedals 26. Optionally provisions may be made for an umbrella and handle to be secured to horizontal bar 16.

Figure 2:
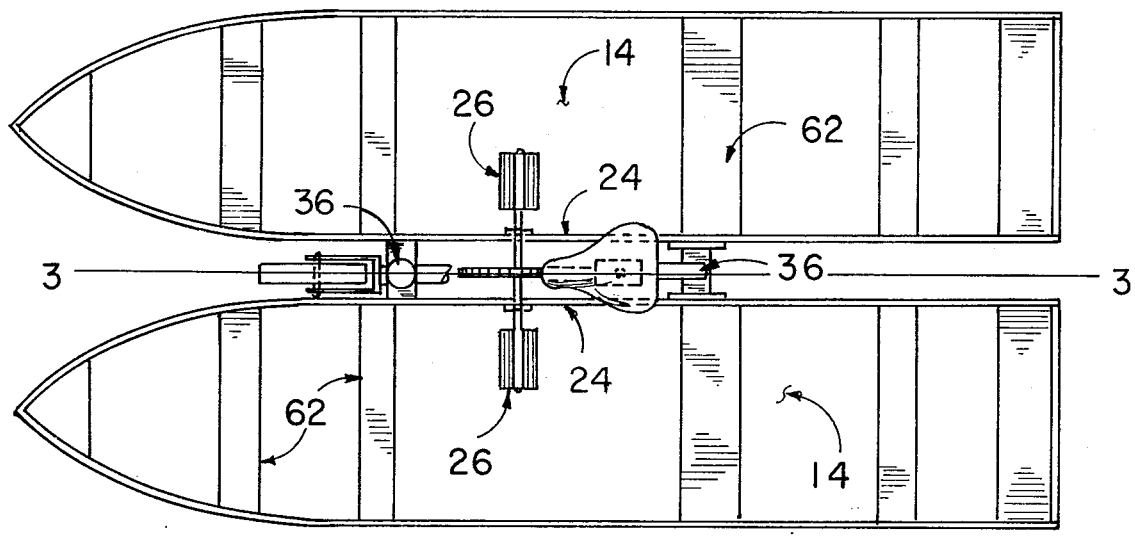
FIG. 2 is a partial top plan thereof.
Figure 4:
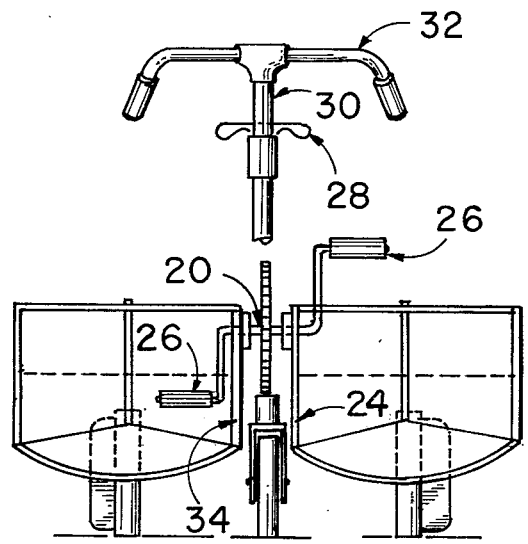
FIG. 4 is a rear plan view of the invention.
Figure 5:
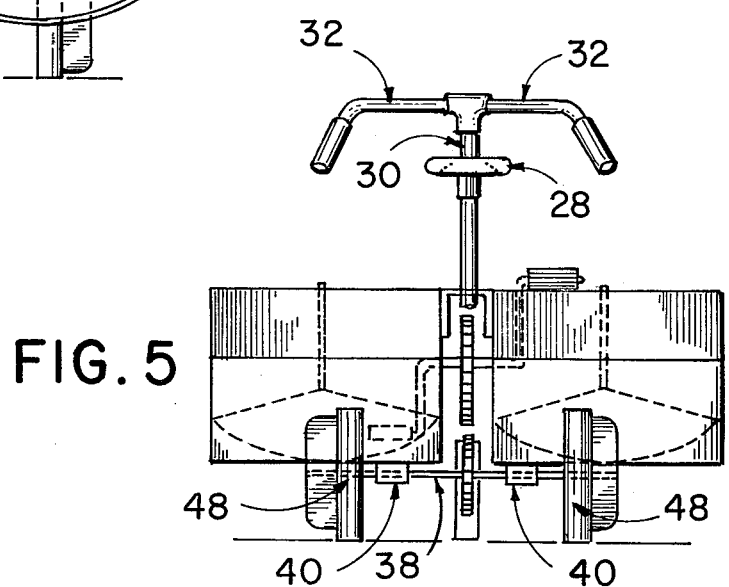
FIG. 5 is a cross-sectional view taken along the lines 5—5 of FIG. 3.
Figure 6:
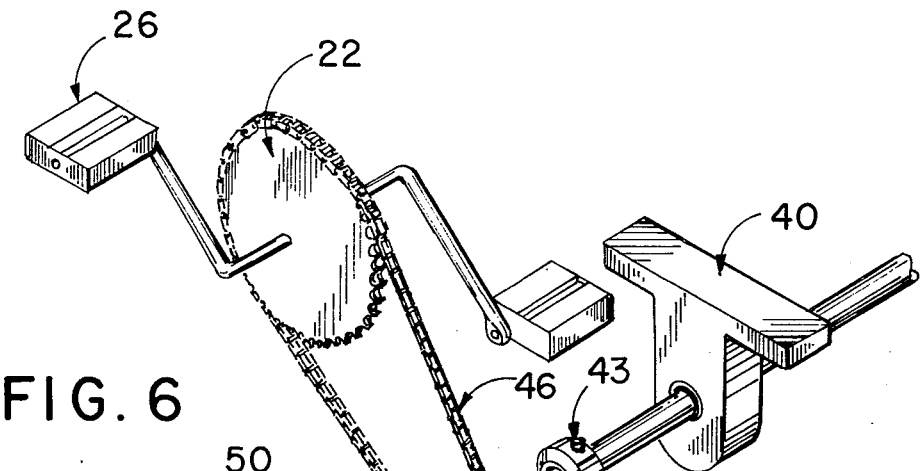
FIG. 6 is a perspective view of the land propulsion of the vehicle of the present invention.
Figure 7:
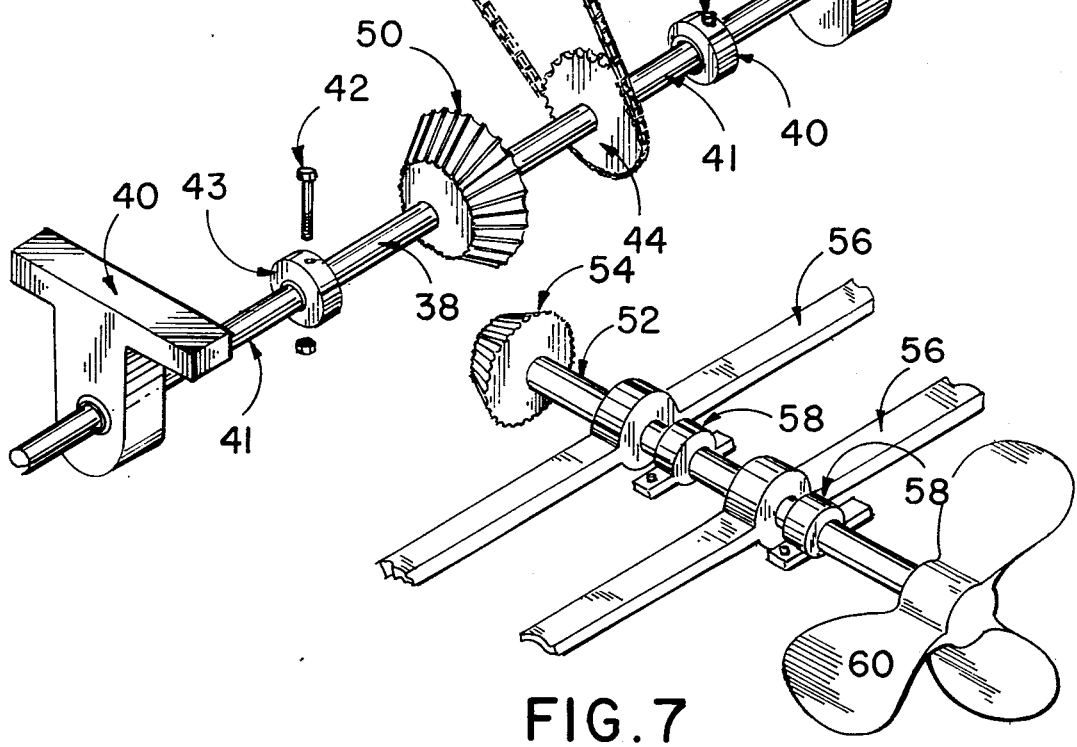
FIG. 7 is a perspective view of the water propulsion mechanism of the present invention.

As shown in FIG. 2, each side boat or hull 14 is provided with a plurality of seats 62 to allow vehicle 10 to carry passengers. To support further the front end of vehicle 10, there may be provided additional front wheels (not shown) located beneath the front ends of hull 14 and connected to the principal steering wheel 34 for turning movement and to the underside of hulls 14 for support.

Waterproof materials and housings may be utilized where appropriate in the fabrication of vehicle 10.

Although there has been disclosed a preferred embodiment of my invention, it is apparent that various modifications and/or additions thereto can be made. For example, alternative means for engaging and disengaging the drive shaft to and from the axle members for propulsion over land and the propeller shaft for propulsion in water would easily occur to those skilled in the art. The invention, in brief, comprises all the modifications and embodiments coming within the scope and spirit of the following claims:

I claim:

1. A dual hull water bicycle for use over land and water comprising in combination:
   two boat hulls each formed by a bottom having a continuous upwardly extending sidewall therearound;
   said hulls having a converging bow and a substantially square stern;
   said bottoms extending upwardly at their bows and sterns; a bicycle frame member centrally disposed between two of said hulls;
   supporting means to secure said bicycle frame to and between said hulls;
   steering means carried by said bicycle frame between the bow ends of said hulls;
   a wheel operatively connected to said steering means and positioned below and between the forward exterior portions of the bows of said hulls;
   a drive shaft extending laterally of, below and rotatably carried by the exterior of each of said hulls adjacent their sterns;
   a bicycle sprocket on said frame member;
   a bicycle pedal within each hull and connected operably with said bicycle sprocket on said frame member;
   a second sprocket on said drive shaft;
   an endless chain carried by said sprockets;
   axle shafts in communication with said drive shaft and extending laterally therefrom such that one axle shaft extends under each of said hulls;
   said axle shafts capable of being engaged with and disengaged from said drive shaft;
   a wheel mounted on each of said axle shafts;
   a bevel gear mounted on said drive shaft;
   a propeller shaft extending rearward from said drive shaft and having a bevel gear on its forward end;
   said propeller shaft being secured between each of said hulls by mounting brackets which permit a slight movement of said propeller shaft such that its bevel gear may be engaged with and disengaged from said bevel gear on said drive shaft.

* * * * *